(12) United States Patent
Nag et al.

(10) Patent No.: US 6,601,064 B1
(45) Date of Patent: Jul. 29, 2003

(54) METHOD AND APPARATUS FOR FETCHING ARRAY BASED OBJECTS BY DIRECT DELIVERY AND BATCHING

(75) Inventors: Biswadeep Nag, Fremont, CA (US); Jie-Bing Yu, Carlsbad, CA (US); Jignesh M. Patel, Ann Arbor, MI (US); Zhe Wang, Santa Clara, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/449,704

(22) Filed: Nov. 24, 1999

(51) Int. Cl.[7] .............................. G06F 17/30; G06F 7/00
(52) U.S. Cl. .............................................. 707/4; 707/2
(58) Field of Search .................................. 707/2–4, 10

(56) References Cited

U.S. PATENT DOCUMENTS

| | | | | |
|---|---|---|---|---|
| 5,857,203 A | * | 1/1999 | Kauffman et al. | 707/10 |
| 5,873,083 A | * | 2/1999 | Jones et al. | 707/4 |
| 5,920,860 A | * | 7/1999 | Maheshwari et al. | 707/5 |
| 6,105,017 A | * | 8/2000 | Kleewein et al. | 707/2 |
| 6,233,586 B1 | * | 5/2001 | Chang et al. | 707/103 |
| 6,327,585 B1 | * | 12/2001 | Nakano et al. | 707/1 |

OTHER PUBLICATIONS

J. Patel et al. Building a Scalable Geo–Spatial DBMS: Technology, Implementation, and Evaluation, SIGMOD 1997, Proceedings ACM SIGMOD International Conference.

D. De Witt et al. "Client–Server Paradise" Proceedings of the 20th VLDB Conference, Santiago, Chile, 1994.

* cited by examiner

Primary Examiner—Greta Robinson
Assistant Examiner—Susan Rayyan
(74) Attorney, Agent, or Firm—Gates & Cooper (57) ABSTRACT

A method, apparatus, article of manufacture, and a memory structure for providing access to an array-based data object to a client is disclosed. The method comprises the steps of receiving a database query from a client; generating a first execution plan from the database query; transmitting at least a portion of the first execution plan to a data server; compiling a query result from the execution of the first execution plan; and transmitting the query result to the client on a first communication path wherein the query result comprises an identification for a master data object responsive to the database query and the master data object comprises an identification for a plurality of array-based objects associated with the master data object. Further, the method comprises the establishment of a second communication path between the data server and the client and the transmission of the master data object to the client via this second communication path. This is followed by a third request by the client for the required array-based objects. This results in the generation of a third execution plan which is executed by the appropriate data server. The resultant array-based objects are then tagged with the corresponding object identification and sent in batched fashion directly to the client via the second communication path.

24 Claims, 7 Drawing Sheets

METHOD AND APPARATUS FOR FETCHING ARRAY BASED OBJECTS BY DIRECT DELIVERY AND BATCHING

CROSS REFERENCE TO RELATED APPLICATIONS

This application is related to the following co-pending and commonly assigned patent application, which is incorporated by reference herein:

application Ser. No. 09/449,085 entitled "QUERY MONITOR PLAYBACK MECHANISM FOR POST-MORTEM PERFORMANCE ANALYSIS" filed on same date herewith, by Jie-Bing Yu, Jun Li, and Karthikeyan Ramasamy.

BACKGROUND OF THE INVENTION

1. Field of the Invention

The present invention relates to systems and methods for performing queries on data stored in a database, and in particular to a method and system for providing access to an array-based data object to a client.

2. Description of the Related Art

Large-scale integrated database management systems provide an efficient, consistent, and secure means for storing and retrieving vast amounts of data. This ability to manage massive amounts of information has become a virtual necessity in business today.

At the same time, wider varieties of data are available for storage and retrieval. In particular, multimedia applications are being introduced and deployed for a wide range of business and entertainment purposes, including multimedia storage, retrieval, and content analysis. Properly managed, multimedia information technology can be used to solve a wide variety of business problems. In some cases, the data objects to be stored, retrieved, and manipulated are quite large. Such data objects include, for example binary large objects (BLOBs), character large objects (CLOBs), video, audio, images, and text.

By virtue of their sheer size, these large data objects can be difficult to manage. For example, to transfer a large data object from a database to a user can take a significant amount of time and consume a significant amount of available communication bandwidth. At the same time it is often the case that the user requesting the large data object is interested in obtaining access to only a small portion of the data object. For example, the user may be interested in obtaining access to only a portion of a very large map or only a small segment of a video program. What is needed is a system and method for efficiently providing large data objects and portions thereof to a requesting client.

SUMMARY OF THE INVENTION

To address the requirements described above, the present invention discloses a method, apparatus, and an article of manufacture for providing efficient access to an array-based data object from a client program.

The method comprises the steps of receiving a database query from a client; generating a first execution plan from the database query; transmitting at least a portion of the first execution plan to a data server; compiling a query result from the execution of the first execution plan; and transmitting the query result to the client on a first communication path wherein the query result comprises an identification for a master data object responsive to the database query and the master data object comprises an identification for a plurality of array-based objects associated with the master data object.

In one embodiment of the invention, the method further comprises the steps of receiving a request for the master data object, the request comprising the identification of the master data object and the client address; transmitting a second execution plan derived from the request for the master data object, and transmitting the master data object directly to the client via a second communication path.

In another embodiment of the invention, the method further comprises the steps of receiving a request for an array-based object, transmitting a third execution plan derived from the request and client address information to the data server, and transmitting the relevant array based objects to the client via the second communication path in a batch mode. Other embodiments of the invention include a program storage device tangibly embodying instructions for performing the method steps above on a computer or similar device, and an apparatus for performing the foregoing operations.

The above-described invention allows large data objects to be transferred from the data server to the client directly rather than through the query coordinator implemented in the database server, thus making the application more responsive. Further, the foregoing invention also allows the data to be transmitted on a second communication link of higher bandwidth. The above-described invention also provides a method for batching array object requests and array object messages to and from the client, thus reducing the need for multiple calls.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
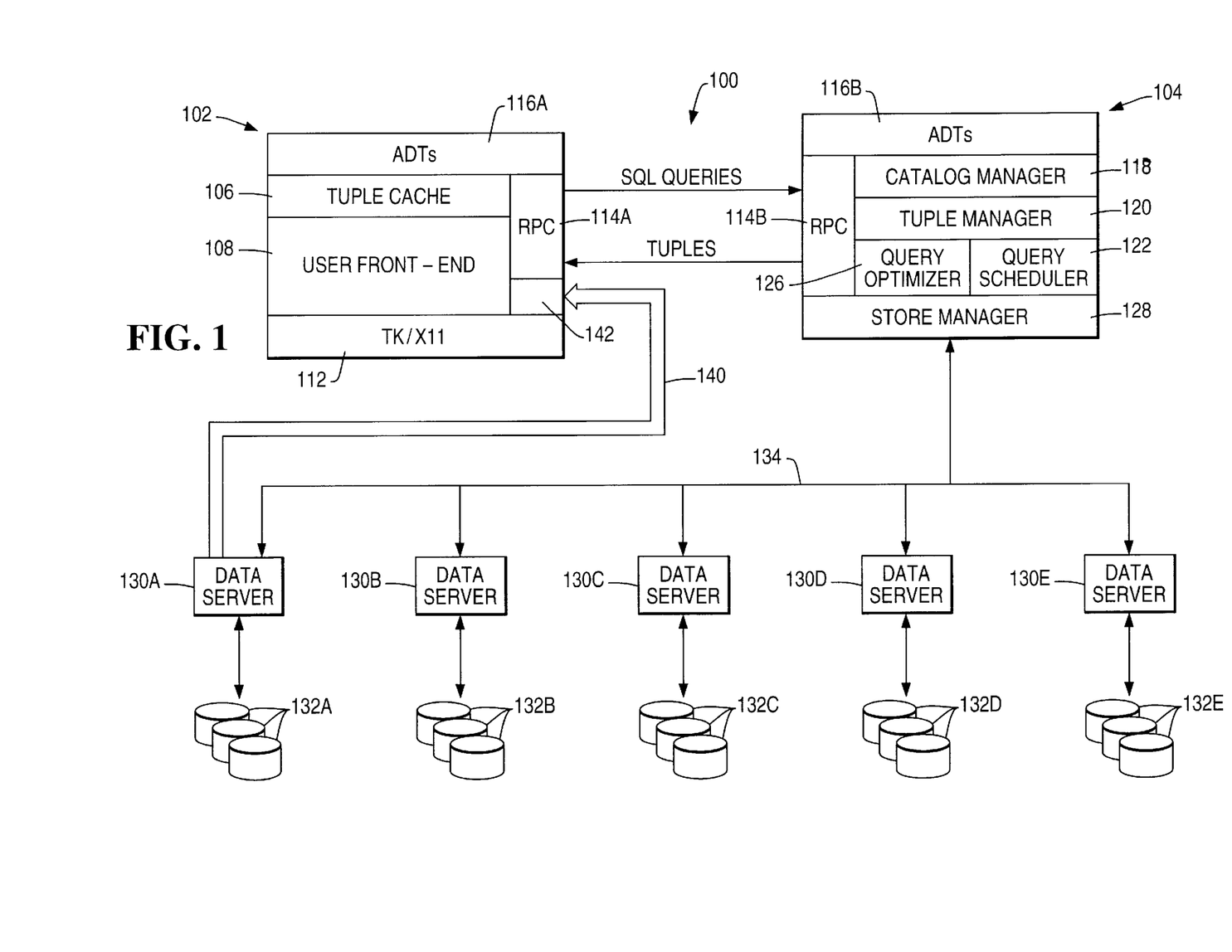
FIG. 1 is a block diagram showing an exemplary environment for practicing the present invention.

FIG. 1 is a diagram showing an exemplary environment in which the present invention may be practiced. The database system 100 uses a client-server architecture comprising a query scheduler 122 implemented in a query coordinator (QC) 104 and one or more data servers (DS) 130A–130E (hereinafter referred to as data server(s) 130) storing data in one or more data storage devices 132A–132E (hereinafter referred to as data storage device(s) 132. The data servers 130 also perform portions of the execution plan in execution threads as determined by the query coordinator 104 to execute the query. The query coordinator 104 and data servers 130 may be implemented in separate machines, or may be implemented as separate or related processes in a single machine. The QC 122 and the DS 130 communicate via a communication infrastructure 134 which can automatically select the most efficient mechanism for the transport of data between the QC 122 and any one of the DS 130 elements. When a message is between processes or entities that do not share a common memory system, a transport protocol such as transmission control protocol (TCP) or message passing interface (MPI) can be utilized to transfer the information. However, when the communication is between processors on a symmetric multiprocessing system (SMP), memory may be used as the transport vehicle.

Client processes 102, which can include applications or graphical user interfaces (GUIs), can connect to the QC 122 for submitting a query. After parsing and optimization, the QC 122 generates an execution plan for the query and transmits portions of that plan to the appropriate data servers 130A–130E for execution. Hence, the QC 122 controls the parallel execution of the query on the DS 130 processes. Query results including result sets are collected by the QC 122 for delivery back to the client process 102.

The QC 122 and DS 130 processes can be implemented as multithreaded processes on top of a storage manager 128. The storage manager 128 provides storage volumes, files of untyped objects, B+ trees and R* trees. Objects can be arbitrarily large, up to the size of the storage volume. In one embodiment, allocation of storage space within a storage volume is performed in terms of fixed size extents. The associated I/O processes and the main storage manager 128 server process share the storage manager 128 buffer pool, which is kept in shared memory.

The database system 100 uses many basic parallelism mechanisms. Tables may be fully partitioned across all disks in the system 100 using round robin, hash, or spatial declustering. When a scan or selection query is executed, a separate thread is started for each fragment of each table.

In one embodiment, the database system 100 also uses a push model of parallelism to implement partitioned execution in which tuples are pushed from leaves of the operator tree upward. Every database system 100 operator (e.g. join, sort, select, . . . ) takes its input from an input stream and places its result tuples on an output stream. The streams themselves are C++ objects and can be specialized in the form of "file streams" and "network streams". File streams are used to read/write tuples from/to disk. Network streams are used to move data between operators either through shared-memory or across a communications network via a transport protocol (e.g. TCP/IP or MPI). In addition to providing transparent communication between operators on the same or different processors, network streams also provide a flow-control mechanism that is used to regulate the execution rates of the different operators in the pipeline. Network streams can be further specialized into split streams, which are used to demultiplex an output stream into multiple output streams based on a function being applied to each tuple. Split streams are one of the key mechanisms used to parallelize queries. Since all types of streams are derived from a base stream class, their interfaces are identical and the implementation of each operator can be totally isolated from the type of stream it reads or writes. At runtime, the scheduler thread (running in the QC process 122), which is used to control the parallel execution of the query, instantiates the correct type of stream objects to connect the operators.

For the most part, the database system uses standard algorithms for each of the basic relational operators. Indexed selections are provided for both non-spatial and spatial selections. For join operations, the query optimizer 126 can choose from nested loops, indexed nested loops, and dynamic memory hybrid hash joins. The database system's query optimizer 126 considers replicating small outer tables when an index exists on the join column of the inner table.

The database system uses a two-phase approach for the parallel execution of aggregate operations. For example, consider a query involving an average operator with a group by clause. During the first phase each participating thread processes its fragment of the input table producing a running sum and count for each group. During the second phase a single processor (typically) combines the results from the first phase to produce an average value for each group.

Since standard SQL has a well defined set of aggregate operators, for each operator the functions that must be performed during the first and second phases are known when the system is being built and, hence, can be hard coded into the system. However, in the case of an object-relational system that supports type extensibility, the set of aggregate operators is not known in advance as each new type added to the system may introduce new operators. Hence, a mechanism is provided for specifying the first and second phase function with the definition of each aggregate.

The query coordinator 104 also comprises a tuple manager 120, a catalog manager 118, a query optimizer 126, a query scheduler 122, and a storage manager 128. The tuple manager receives the tuples from the data servers 130, formats and processes the tuples, and passes them along to the client program. The catalog manager 118 manages metadata regarding the tables and types in the database. The query optimizer generates an execution plan for queries received from the client process 102.

The client program 102 comprises a front end 108, which provides a graphical user interface that supports querying, browsing, and updating of database objects through either its graphical or textual user interfaces. In either case, the front end transforms a query into an extended SQL syntax and transmits it to the data server 130 for execution. After executing the query, the query coordinator 104 transmits the results back to the client program 102 in the form of a set of tuples which can be iterated over using a cursor mechanism. In one embodiment, all communications between the front end 108 and the processes implemented in the query coordinator 104 are in the form of remote procedure calls 114A and 114B (collectively alternatively referred to hereinafter as remote procedure calls 114) implemented over a Transmission Control Protocol/Internet Protocol (TCP/IP). The client process 102 also comprises a tuple cache 106 for retaining tuples received from the query coordinator 104. Abstract Data Types (ADTs) 116A and 116B can be stored and/or processed in either the query coordinator 104 or the client process 102.

The client front end 108 permits the display of objects with spatial attributes on a 2-D map. For objects with multiple spatial attributes, one of the spatial attributes can be used to specify the position of the object on the screen. The spatial ADTs currently supported include points, closed polygons, polylines, and raster images.

The client front end 108 can also present a layered display of overlapping spatial attributes from different queries or tables. For example, one can display city objects that satisfy a certain predicate (e.g. population>300K) in one layer on top of a second layer of country objects.

The client front end 108 also allows the user to query through a graphical interface; implicitly issuing spatial queries by zooming, clicking, or sketching a rubber-banded box on the 2-D map. The graphical capabilities of the client can be implemented using toolkits 112 such as Tk/X11. Further, the user can queny by explicitly composing ad-hoc queries in the database system's 100 extended SQL syntax.

The user can use the client front end 108 to browse the objects from a table. In this mode, attributes are displayed as ASCII strings. The front end 108 can also be used to update database objects. Object(s) to be updated can be selected either by pointing-and-clicking on the 2-D map or by selecting via the textual browser.

Finally, the client front end 108 can also be used to perform general catalog operations including browsing, creating new databases, defining new tables, creating indices on attributes, and bulk loading data into tables from external files.

The database system 100 also advantageously uses a second communication path 140 to transmit selected data such as master object data and large objects to the client 102, as described further below. This data is received by the direct data transfer module 142 in the client 102.

Figure 2:
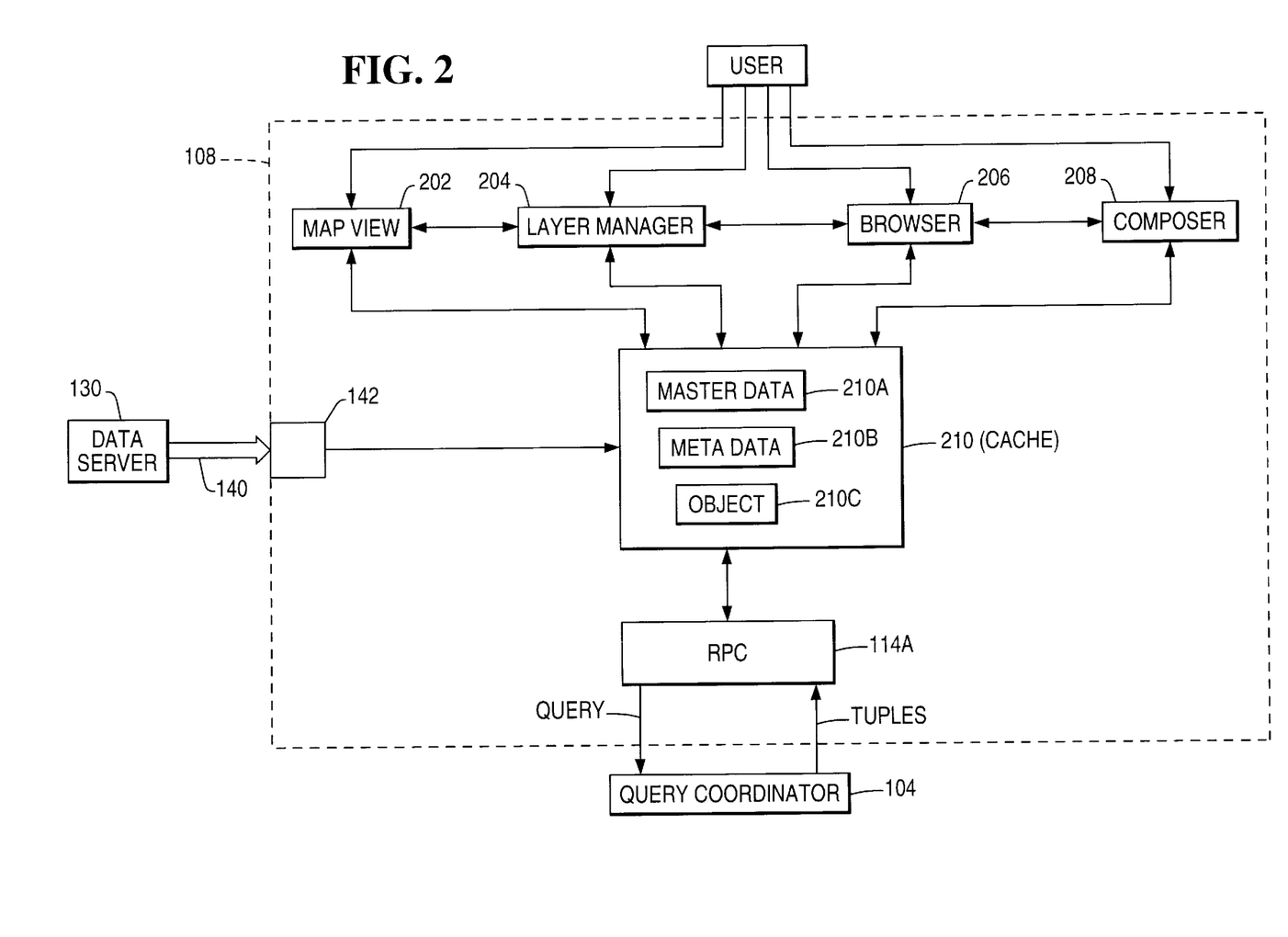
FIG. 2 is a diagram showing one embodiment of the user front end of the exemplary hardware environment depicted in FIG. 1.

FIG. 2 is a diagram showing one embodiment of the user front end of the exemplary environment depicted in FIG. 1. The client front end 108 comprises a map view 202, layer manager 204, browser 206 and a query composer 208. The map view 202 is responsible for displaying and manipulating objects contained in one or more layers. The current position of the cursor is continuously displayed in a sub-window in units of the map projection system. Users can point and click on displayed objects to view their non-spatial attributes. The layer manager 204 is responsible for adding, deleting, hiding, and reordering layers displayed by the map view 202. Each layer corresponds to a table of objects produced by executing some query. The extent browser 206 allows a user to view any database table and adjust the way it should be displayed by the map view 202. The selected table becomes a new layer with its spatial attributes displayable via the map view 202.

The query composer 208 allows a user to compose a SQL query using a simple text editor. The RPC 114 is the interface to the query coordinator 104. It ships SQL queries to the query coordinator 104 for execution and retrieves result tuples into the cache 210. The cache 210 comprises a master data cache 210A, a metadata cache 210B and an object cache 210C. The object cache 210C caches the result of a query in formats understood by the map view 202. The metadata cache 210B stores the catalog information of the currently open database. The master data cache 210A stores retrieved master data as described further below. In one embodiment, the object cache 210C also caches the objects downloaded from the data servers 130. FIG. 2 also shows the second communication path 140 from the data server 130 to the user front end 108 via the direct data transfer module 142.

Array-based abstract data types can be used as basis for a number of useful data types, including BLOBs, CLOBs, video, audio, text, image, maps and other large objects. Array-based ADT use an external out-of-line storage for very large objects.

Figure 3A:
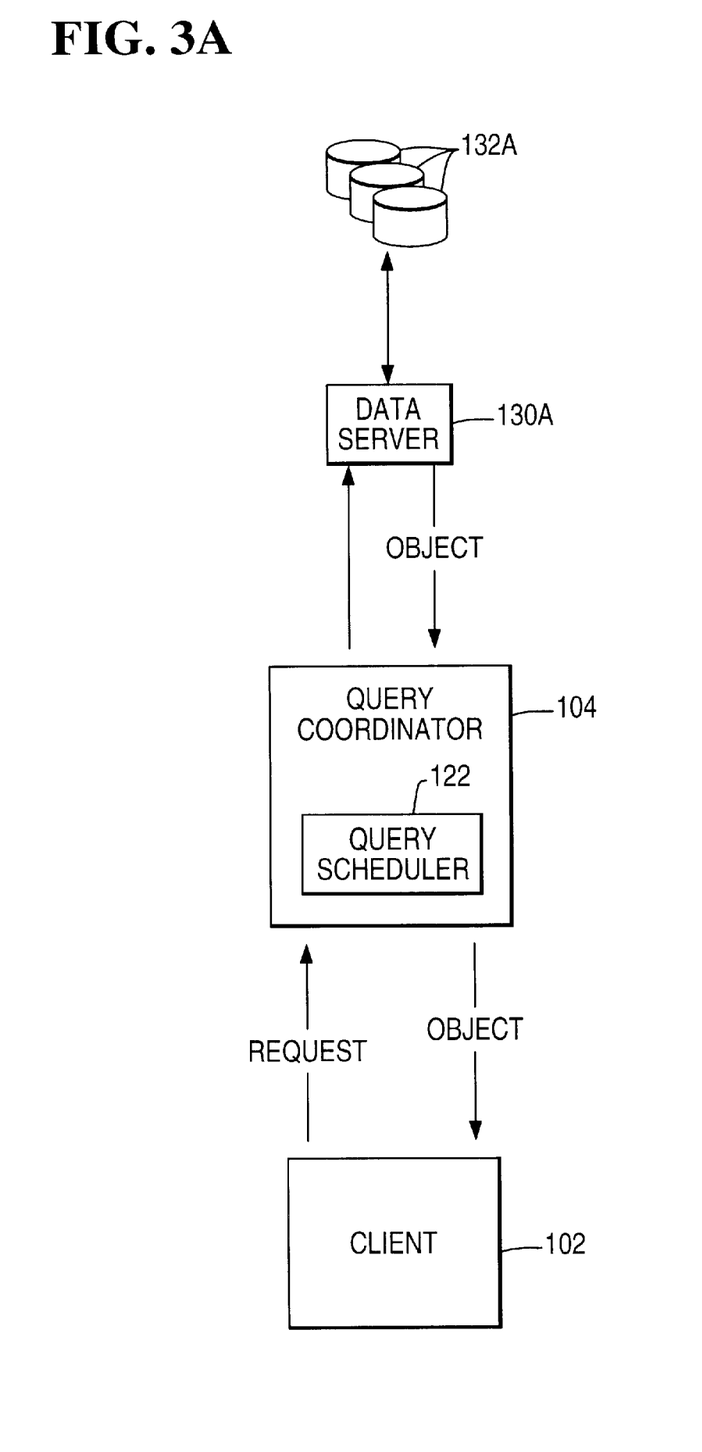
FIGS. 3A and 3B are diagrams showing the fetching of an array-based ADT from the data server to the client.

FIG. 3A is a diagram showing the traditional way of fetching of an array-based ADT from the data server 130A to the client 102. When the query result containing array-based ADT gets fetched from the data server 130 to the client process, the out-of-line data is not transmitted back to client 102 together with the tuple data. Only the metadata describing the array ADT are contained in-place in the tuples for the array attribute. Later access to array element is done on-demand by a separate fetch call back to query coordinator 104 to retrieve the relevant objects from out-of-line data stored in the data servers 130. The traditional method of retrieval requires the data server 130 to ship the data back to the query coordinator 104 before being sent back to the client process.

In multi-tier web database applications, a typical web server workload can trigger the fetching of a number of tuples containing image or text data types. For this kind of application, the latency of fetching those array-based objects can be directly visible to the end-user browser. To minimize this effect, retrieval overhead should be kept as low as possible.

Figure 3B:
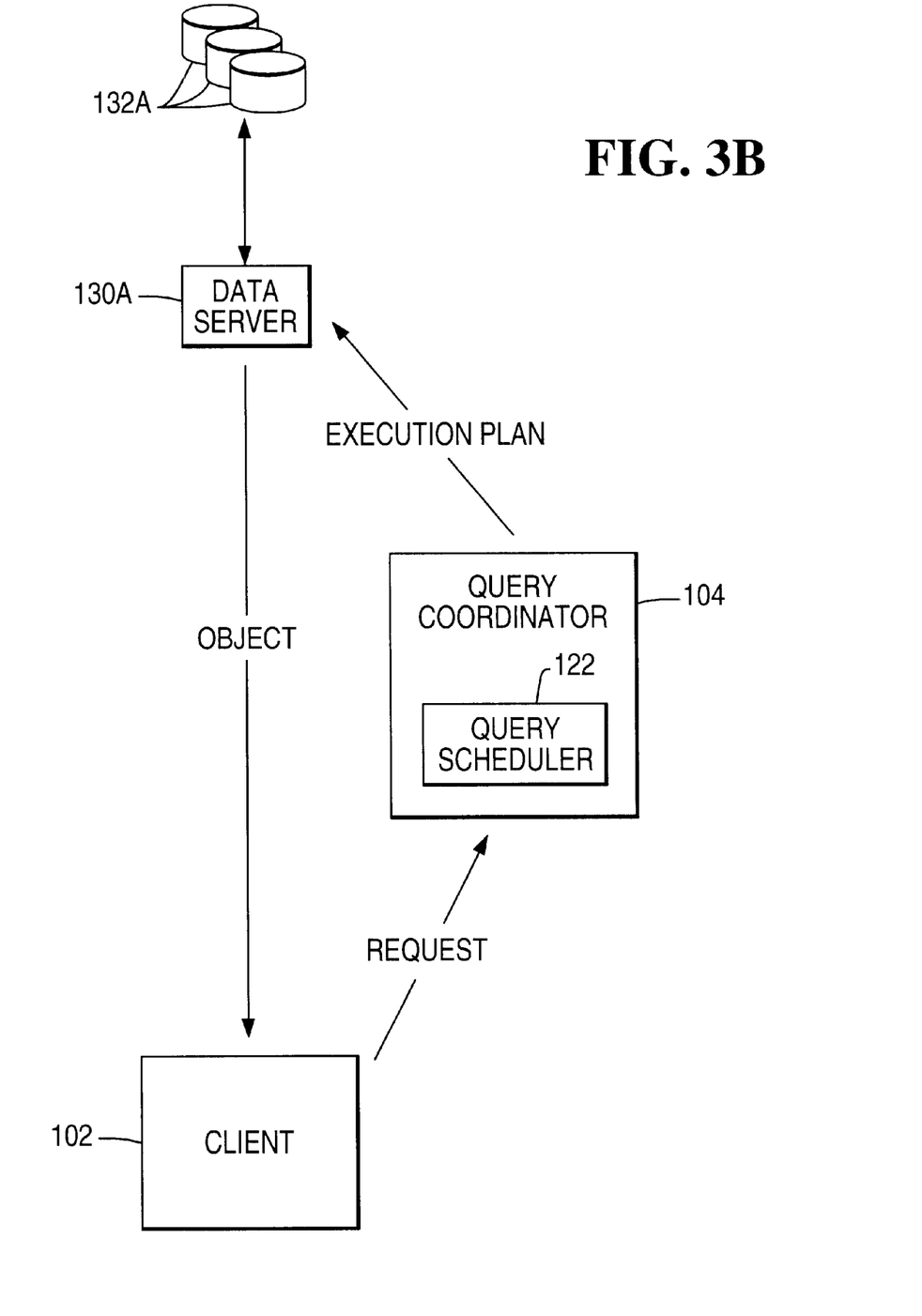

FIG. 3B is a diagram showing how the present invention enhances the performance of array-based ADT retrieval by the client 102 by implementing a direct object delivery from data servers to client and batching all the large object fetches to lower fetch overhead The direct object delivery reduces bottlenecks in data transmission in the query coordinator 104, while the batching of large object fetches lowers the fetch overhead.

In one embodiment, result tuples having large objects such as images are given special attention. Such attributes are not returned until they are actually used by the application program. This typically occurs when the application invokes a method on an attribute. In addition, only the portion of the object that is actually needed by the client process 102 is retrieved from the relevant DS 130.

In one embodiment, if a client process 102 needs only a small subarray or data object out of the middle of a large multi-dimensional array, only the subarray itself is fetched. However, since this amount of data may itself be substantial, a data pipeline from the DS 130 to the client 102 application is established so that the data may be transferred efficiently and with minimal delay. This is accomplished by passing the client IP address and port number along with the object requests and establishing a transport connection using this client address between the DS 130 storing the data of interest and the client 102 on a second communication path 140. The incoming data from the DS 130 can be passed through a direct data transfer module 142 in the client 102 to format the data and comply with the transfer protocol. In addition, the invention employs batching of object requests and batched delivery of object data to avoid the overhead of multiple messages. Such batching of requests and data can take place across all the object ids referred in a single tuple or even across multiple tuples in the result set. To sort out the data belonging to each fetched object, the data sent from the data servers to the client are tagged with the appropriate object id.

To illustrate the foregoing, consider the case where the attribute or data object is a map. The entire map can be represented as a master data object and a plurality of array based objects. The master data object is identified by (and hence, retrievable with) a master data object identification (MOID). The master data object can also include an identification for all of the array based objects (AOIDs) which collectively define the master data object. If only a portion of the map is selected by the user, only the objects required to present that portion are fetched and provided to the user. This is accomplished by supplying the AOIDs for those objects to the query coordinator 104 and ultimately, the data server 130. If the entire map is required, all of the AOIDs are provided in a batched fashion and the entire map is retrieved in one message round trip.

Figure 4A:
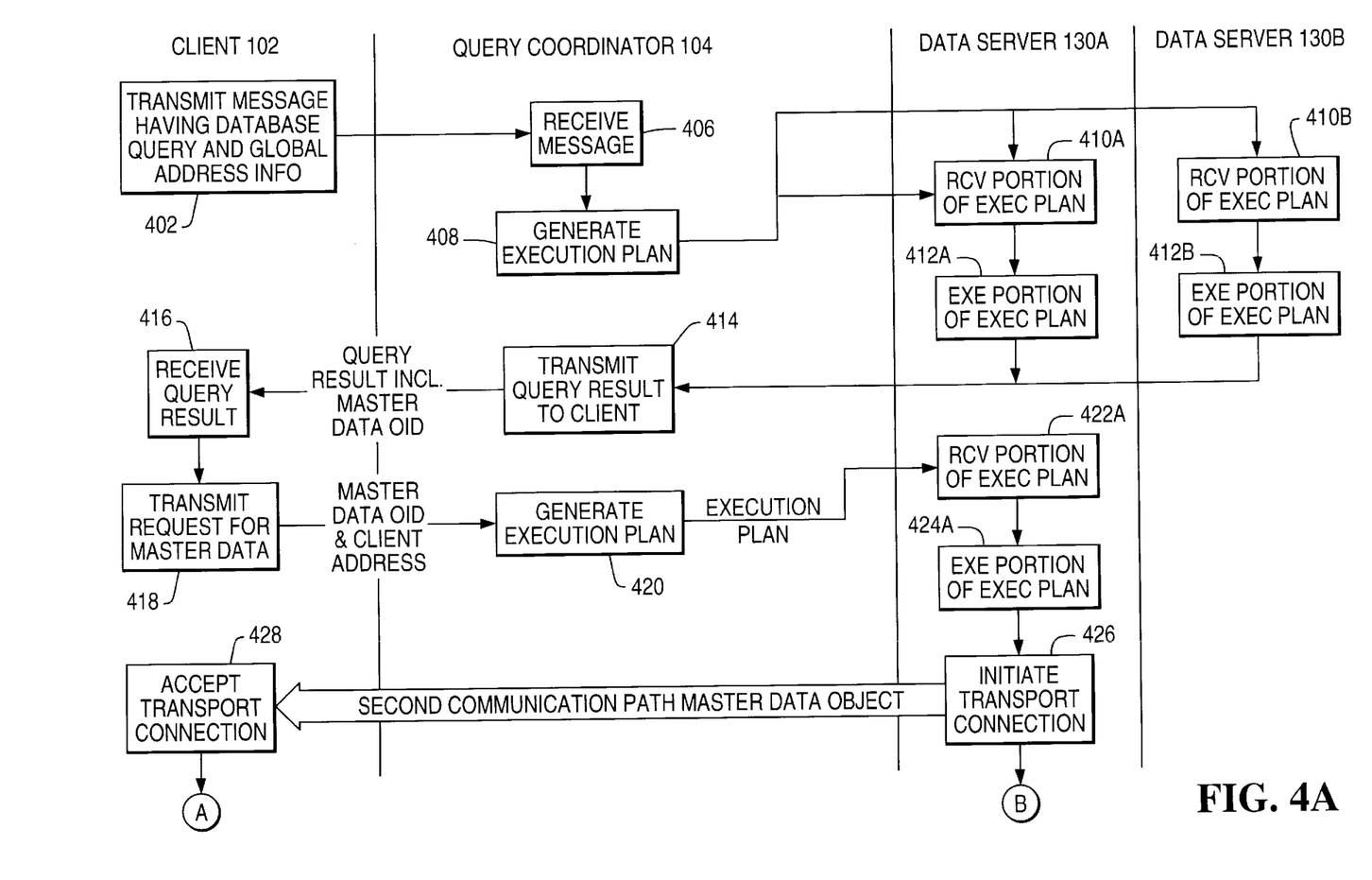
FIGS. 4A and 4B are diagrams illustrating one embodiment of the present invention.

FIG. 4A is a diagram illustrating one embodiment of the present invention. The client 102 transmits 402 a message to the query coordinator 104. The message includes a database query, and may optionally include client address information. The query coordinator 104 receives 406 the message and using the information in the message, generates 408 an execution plan. The execution plan is then parsed into one or more portions, each of which represents an execution plan thread. These are transmitted to the data servers 130, which receive 410A and 410B (hereinafter alternatively collectively referred to as 410) and execute 412A and 412B (hereinafter alternatively collectively referred to as 412) their respective portions of the execution plan. Results from the data servers 130 are transmitted to the query coordinator 104, which compiles the results into a query result having a result set. This information is transmitted 414 back to the client 102. In one embodiment, this query result information includes an object identification (OID) for the master data (MOID). Other query result information may also be included, such as the dimensions and size of the master data.

It is important to note that master data associated with the MOID (that which is responsive to the database query) can be quite large. Hence, while the master data could be delivered via the query coordinator 104 to the client 102, such delivery is best accomplished by direct transfer from the data server in such cases.

Returning to FIG. 4A, the client transmits 418 a request for the master data. Included in this request is the OID for the master data (the MOID). In one embodiment, this client address information is globally unique and includes the client address and port.

The query coordinator 104 accepts this message, and from the information in the message, generates 420 another execution plan. This execution plan (which includes the client global address) is simpler than the one generated previously (to respond to the database query), but nonetheless, still requires the generation of a fetch object operator. Alternatively, the MOID can be transmitted from the client 102 to the data server 130 without intervention of the query coordinator 104, or the query coordinator 104 can simply accept the request for the master data and pass it along to the data server 130.

The data server 130 receives 422A and executes 424A the applicable portion of the execution plan, and initiates 426 a transport connection with the client 102 via the second communication path 140 using the client IP address and port number. The client 102 accepts 428 the transport connection.

Figure 4B:
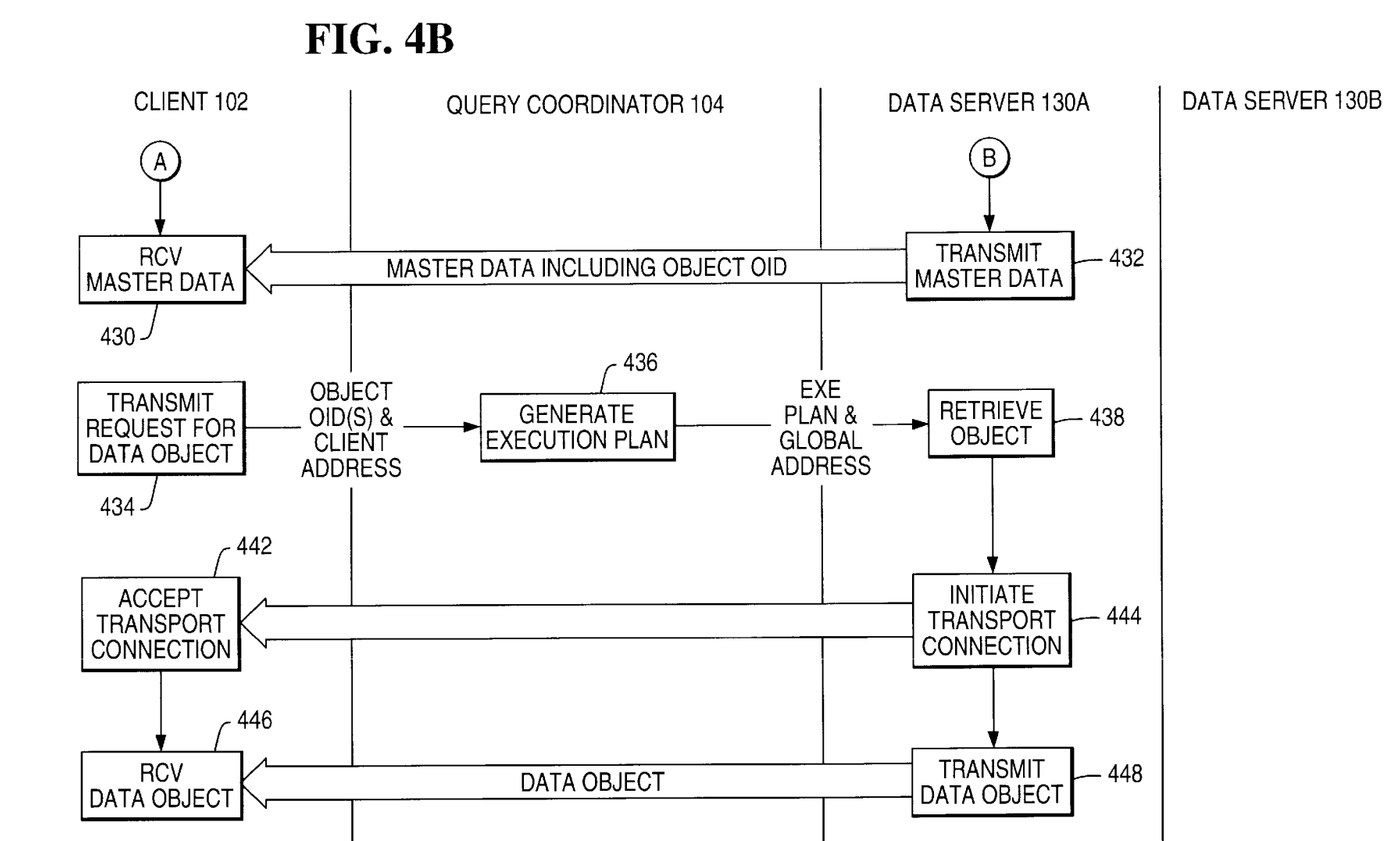

FIG. 4B shows the client data server transmitting 432 the master data via the transport connection on the second communication path 140 to the client 102 where it is received 430. In one embodiment, the master data includes information such as the dimensions and size of the related master object, and an object identification (AOID) for the data objects associated with the master data object.

The user may then-request one or more data objects in the array that cumulatively represents the master data object. This data is represented in one of the data objects, having related object identifications (AOIDs) that were transmitted with the master data object. That request can be submitted by transmitting 434 a message including the AOIDs of the data objects of interest and the address of the client 102 to the query coordinator 104. The query coordinator 104 again generates 436 a simple execution plan designed to retrieve the data objects of interest from the data server 130. The execution plan and the address of the client 102 are sent to the data server 130, which retrieves 438 the objects from the storage manager. In one embodiment, the data server uses the client address to initiate 444 a transport connection with the client 102. The client 102 accepts 442 the transport connection. In another embodiment of the present invention, the transport connection originally established with the client 102 (in block 426) is maintained for the duration of the session with the client 102. In this embodiment, there is no need to re-establish the transport connection between the data server 130 and the client 102. In any case, the data server 130 transmits 448 the requested data object, and the client 102 receives 446 it through the second communication path 140.

Using the foregoing technique, all of the AOIDs for the master data are collected across all of the tuples in the current query result set, and are fetched all in one batch. Similarly, the array data objects can be fetched in batch mode The same approach can be applied to the real objects themselves. It should be noted that batched fetching of array objects, may raise a large memory management problem. In the foregoing description, client side operations on array-based abstract data types retrieve small portions (those which are needed) of the object data on demand, thus providing an efficient retrieval mechanism. Simply caching the entire object is less beneficial, incurs extra overhead in the shipping of the large objects, and can dramatically increase the cache memory size requirements. However, if all of the required portions of the objects can be identified in advance before initiating the first fetch request, then the above-described batching technique can be applied to the fetching of the real object as well.

Figure 5:
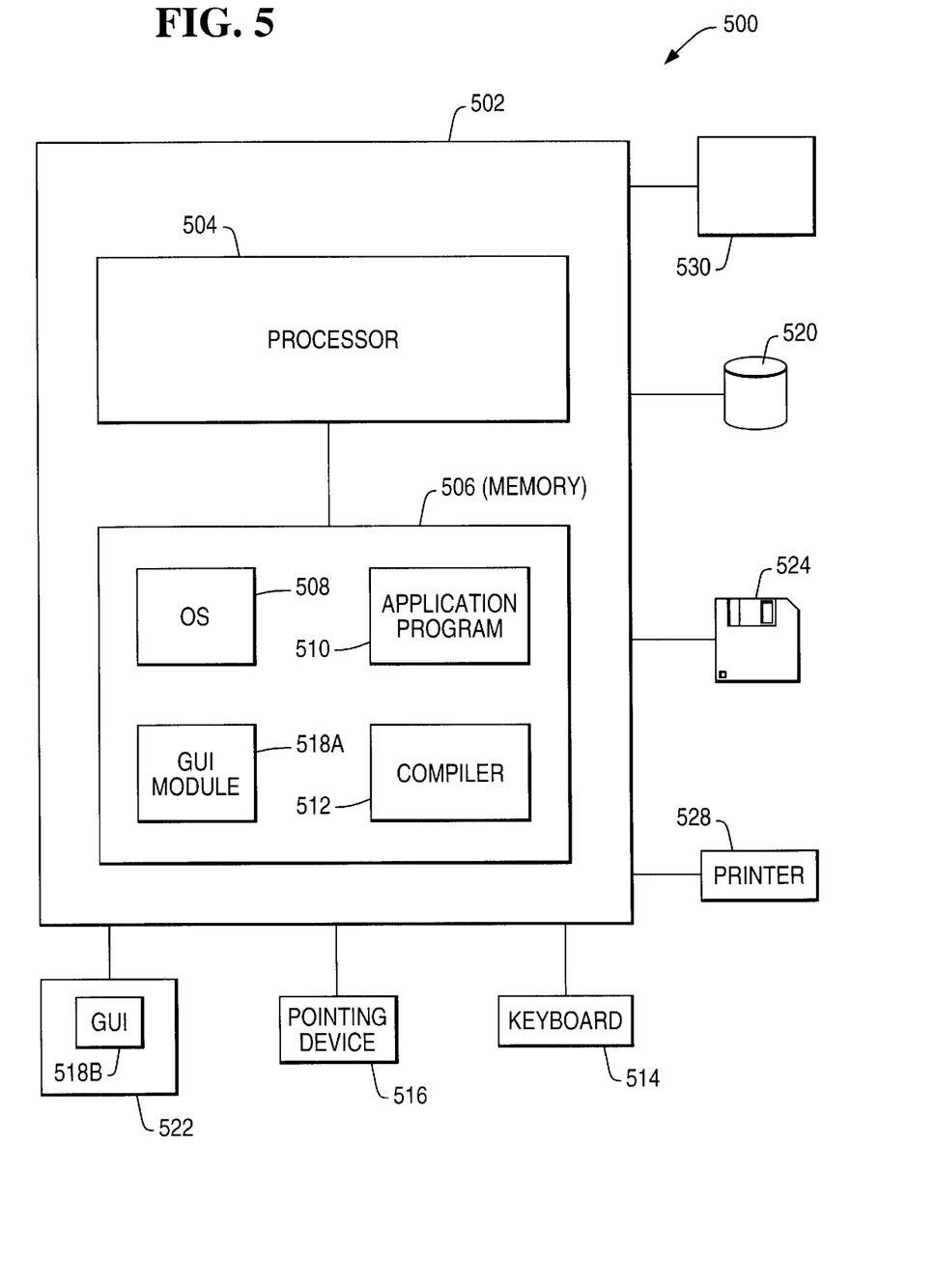
FIG. 5 is a diagram illustrating an exemplary computer system that could be used to implement the present invention.

FIG. 5 illustrates an exemplary computer system 500 that could be used to implement the present invention. The computer 502 comprises a processor 504 and a memory, such as random access memory (RAM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518A is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device 530 such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the steps necessary to implement and/or use the present invention. Computer program 510 and/or operating instructions may also be tangibly embodied in memory 506 and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. In summary, the present invention describes a method, apparatus, and article of manufacture for providing access to an array-based data object to a client.

The method comprises the steps of receiving a database query from a client; generating a first execution plan from the database query; transmitting at least a portion of the first execution plan to a data server; compiling a query result from the execution of the first execution plan; and transmitting the query result to the client on a first communication path wherein the query result comprises an identification for a master data object responsive to the database query and the master data object comprises an identification for a plurality of array-based objects associated with the master data object.

In one embodiment of the invention, the method further comprises the steps of receiving a request for the master data object, the request comprising the identification of the master data object; transmitting a second execution plan derived from the request for the master data object, and transmitting the master data object directly to the client via a second communication path.

In another embodiment of the invention, the method further comprises the steps of receiving a request for an array-based object, transmitting a third execution plan derived from the request and client address information to the data server, and transmitting the array based object directly to the client via the second communication path. This includes the technique of batching requests for different parts of the array object into one signal message for purposes of efficiency. Other embodiments of the invention include a program storage device tangibly embodying instructions for performing the method steps above on a computer or similar device, and an apparatus for performing the foregoing operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing a data object to a client, comprising the steps of:

receiving a database query from a client;

generating a first execution plan from the database query;

transmitting at least a portion of the first execution plan to a data server;

compiling a query result from the execution of the first execution plan; and transmitting the query result to the client on a first communication path, the query result including an identification for a master data object responsive to the data base query, wherein the master data object comprises an identification for a plurality of array-based objects associated with the master data object;

receiving a request comprising the identification for the master data object and client address information; and transmitting a second execution plan derived from the request, the second execution plan including the client address information.

2. The method of claim 1, wherein the request is a request for the master data object and associated array-based objects, and the second execution plan is derived from the request for the master data object and associated array-based objects, and wherein the method further comprises the step of transmitting the master data object and the associated array-based objects to the client via a second communication path.

3. The method of claim 2, wherein the step of transmitting the master data object and the associated array-based objects to the client via the second communication path comprises the steps of:

initiating a transport connection on a second communication path between the data server and the client using the client address information; and transmitting the master data object and the associated array-based objects via the transport connection.

4. The method of claim 1, wherein the request is a request for the master data object, and the second execution plan is derived from the request for the master data object, and wherein the method further comprises the step of transmitting the master data object to the client via a second communication path.

5. The method of claim 4, wherein the step of transmitting the master data object to the client via the second communication path comprises the steps of:

initiating a transport connection on a second communication path between the data server and the client using the client address information; and transmitting the master data object to the client via the transport connection.

6. The method of claim 1, wherein the request is a request for a subarray of the array-based objects comprising the identification of the array based objects of the subarray, and the second execution plan is derived from the request for the subarray of the array-based objects, and wherein the method further comprises the step of transmitting the subarray of the array-based objects to the client via the second communication path.

7. The method of claim 6, wherein the step of transmitting the subarray of the array-based objects to the client via the second communication path comprises the step of transmitting the subarray of the array-based objects to the client via the transport connection.

8. The method of claim 7, wherein the request for the subarray of the array based objects is a batch request and the subarray of the array based objects is transmitted in a batch mode by a message including at least one segment having the identification of the array based objects in the subarray and the associated subarray object data.

9. An apparatus for providing a data object to a client, comprising:
   means for receiving a database query from a client;
   means for generating a first execution plan from the database query;
   means for transmitting at least a portion of the first execution plan to a data server;
   means for compiling a query result from the execution of the first execution plan; and
   means for transmitting the query result to the client on a first communication path, the query result including an identification for a master data object responsive to the data base query, wherein the master data object comprises an identification for a plurality of array-based objects associated with the master data object;
   means for receiving a request comprising the identification for the master data object and client address information; and
   means for transmitting a second execution plan derived from the request, the second execution plan including the client address information.

10. The apparatus of claim 9, wherein the request is a request for the master data object and associated array-based objects, and the second execution plan is derived from the request for the master data object and associated array-based objects, and wherein the apparatus further comprises means for transmitting the master data object and the associated array-based objects to the client via a second communication path.

11. The apparatus of claim 10, wherein the means for transmitting the master data object and the associated array-based objects to the client via the second communication path comprises:
   means for initiating a transport connection on a second communication path between the data server and the client using the client address information; and
   means for transmitting the master data object and the associated array-based objects via the transport connection.

12. The apparatus of claim 9, wherein the request is a request for the master data object, and the second execution plan is derived from the request for the master data object, and wherein the apparatus further comprises means for transmitting the master data object to the client via a second communication path.

13. The apparatus of claim 12, wherein the means for transmitting the master data object to the client via the second communication path comprises:
   means for initiating a transport connection on a second communication path between the data server and the client using the global client address information; and
   means for transmitting the master data object to the client via the transport connection.

14. The apparatus of claim 9, wherein the request is a request for a subarray of the array-based objects comprising the identification of the array based objects of the subarray, and the second execution plan is derived from the request for the subarray of the array-based objects, and wherein the apparatus further comprises means for transmitting the subarray of the array-based objects to the client via the second communication path.

15. The apparatus of claim 14, wherein the means for transmitting the subarray of the array-based objects to the client via the second communication path comprises means for transmitting the subarray of the array-based objects to the client via the transport connection.

16. The apparatus of claim 15, wherein the request for the subarray of the array based objects is a batch request and the subarray of the array based objects is transmitted in a batch mode by a message including at least one segment having the identification of the array based objects in the subarray and the associated subarray object data.

17. A program storage device, readable by a computer, tangibly embodying at least one program of instructions executable by the computer to perform method steps of providing a data object to a client, the method steps comprising the steps of:
   receiving a database query from a client;
   generating a first execution plan from the database query;
   transmitting at least a portion of the first execution plan to a data server;
   compiling a query result from the execution of the first execution plan; and
   transmitting the query result to the client on a first communication path, the query result including an identification for a master data object responsive to the data base query, wherein the master data object comprises an identification for a plurality of array-based objects associated with the master data object;
   receiving a request comprising the identification for the master data object and client address information; and
   transmitting a second execution plan derived from the request, the second execution plan including the client address information.

18. The program storage device of claim 17, wherein the request is a request for the master data object and associated array-based objects, and the second execution plan is derived from the request for the master data object and associated array-based objects, and wherein the method steps further comprise the step of transmitting the master data object and the associated array-based objects to the client via a second communication path.

19. The program storage device of claim 18, wherein the method step of transmitting the master data object and the associated array-based objects to the client via the second communication path comprises the method steps of:
   initiating a transport connection on a second communication path between the data server and the client using the client address information; and
   transmitting the master data object and the associated array-based objects via the transport connection.

20. The program storage device of claim 17, wherein the request is a request for the master data object, and the second execution plan is derived from the request for the master data object, and wherein the method steps further comprise the steps of transmitting the master data object to the client via a second communication path.

21. The program storage device of claim 20, wherein the step of transmitting the master data object to the client via the second communication path comprises the method steps of:
   initiating a transport connection on a second communication path between the data server and the client using the global client address information; and
   transmitting the master data object to the client via the transport connection.

22. The program storage device of claim 17, wherein the request is a request for a subarray of the array-based objects comprising the identification of the array based objects of the subarray, and the second execution plan is derived from the request for the subarray of the array-based objects, and wherein the method steps further comprise the step of transmitting the subarray of the array-based objects to the client via the second communication path.

23. The program storage device of claim 22, wherein the step of transmitting the subarray of the array-based objects to the client via the second communication path comprises the step of transmitting the subarray of the array-based objects to the client via the transport connection.

24. The program storage device of claim 23, wherein the request for the subarray of the array based objects is a batch request and the subarray of the array based objects is transmitted in a batch mode by a message including at least one segment having the identification of the array based objects in the subarray and the associated subarray object data.

\* \* \* \* \*